United States Patent [19]

van Es et al.

[11] 4,040,027
[45] Aug. 2, 1977

[54] DIGITAL DATA TRANSFER SYSTEM HAVING DELAYED INFORMATION READOUT FROM A FIRST MEMORY INTO A SECOND MEMORY

[75] Inventors: Lambertus Gerardus van Es, Apeldoorn; Hendrik Arie van Essen; Nicolaas Cornelis de Troye, both of Eindhoven, all of Netherlands

[73] Assignee: U.S. Philips Corporation, New York, N.Y.

[21] Appl. No.: 678,869

[22] Filed: Apr. 21, 1976

[30] Foreign Application Priority Data

Apr. 25, 1975 Netherlands .................. 7504901

[51] Int. Cl.² .................. G06F 13/00; G11C 9/00
[52] U.S. Cl. .................. 364/900
[58] Field of Search .................. 340/172.5; 445/1

[56] References Cited

U.S. PATENT DOCUMENTS

| | | | |
|---|---|---|---|
| 3,209,332 | 9/1965 | Doersam, Jr. | 340/172.5 |
| 3,293,613 | 12/1966 | Gabor | 340/172.5 |
| 3,406,378 | 10/1968 | Bradford | 340/172.5 |
| 3,573,745 | 4/1971 | May, Jr. | 340/172.5 |
| 3,588,840 | 6/1971 | Nomura et al. | 340/172.5 |

*Primary Examiner*—Melvin B. Chapnick
*Attorney, Agent, or Firm*—Frank R. Trifari; Daniel R. McGlynn

[57] ABSTRACT

A digital data transfer system having information read-out from a first memory to a user device through temporary storage in an intermediate second memory. The system includes a measuring device which determines the extent to which the second memory is filled with information read-out from the first memory while the information is being transferred to the user device from the second memory. Upon detecting a predetermined first degree of filling, the measuring device produces a first alarm signal which, after a given first delay, is used to temporarily block further read-out of information from the first memory. Afer a predetermined second degree of filling of the second memory in then detected, the measuring device produces a second alarm signal which, after a given second delay, is used to resume the read-out of information from the first memory to the second memory.

8 Claims, 4 Drawing Figures

4,040,027

DIGITAL DATA TRANSFER SYSTEM HAVING DELAYED INFORMATION READOUT FROM A FIRST MEMORY INTO A SECOND MEMORY

BACKGROUND OF THE INVENTION

The invention relates to a device for treating digital information elements, comprising a generating device including a first memory, a read-out device which is connected thereto and which is capable of sequentially producing digital information elements, read under the control of a read command signal received, on a first information output, the first information output being connected, via a connection line, to a pickup device including a second memory for temporarily storing digital information elements received and for subsequently applying these elements to a second information output connected thereto, a measuring device being provided for detecting the degree of filling of the second memory, the measuring device comprising means for supplying at least two different alarm signals under the control of the degree of filling.

A device of this kind, intended for the equalization of the speed of a tape reader, is known from the article by R. A. Skov and E. G. Newman, "Buffer System", IBM Technical Disclosure Bulletin, Volume 2, No. 5, February, 1960, pages 86–89. In accordance with the known technique, the (analog) drive speed is increased if the second memory is less than half full ($\leq 2.6$), whilst the speed is decreased if it is more than half full ($\geq 4/6$). The information is output to a synchronously operating device.

SUMMARY OF THE INVENTION

The present invention on the one hand utilizes such a (second) memory in which various degrees of filling produce corresponding alarm signals. On the other hand, the present invention relates to a system in which the drive speed need not be controlled; consequently, no digital-to-analog converter is required either. In accordance with the invention, two stations which are asynchronous relative to each other can communicate. The invention has for its object to preclude overfilling of the second memory. Only a minimum effect is exerted on the generating device, so that this device can operate freely. The invention can be used in completely different fields of digital data processing. The invention is characterized in that when the reaching of a first filling degree of the second memory in the upwards direction is detected, a first alarm signal appears on a control output of the measuring device in order to block the said read command signal by way of a first control signal after a first delay during which at the most as many information elements as can find room in the second memory can be read before an overflow condition occurs, after the first alarm signal, when a second filling degree of the second memory is reached in the downwards direction, the measuring device applying a second control signal to the read-out device in order to unblock the read command signal after a second delay.

The second memory preferably comprises a shift register for the temporary storage of the digital information elements. This results in a simple organization.

The first delay preferably corresponds to the run-out time of a mechanical drive for transporting a carrier with the first memory along the said read-out device. A comparatively slowly reacting read-out device can thus be used.

The read-out device preferably comprises means for detecting the reading of a coherent information entity as a unit, the latter detection, in co-operation with the first alarm signal, directly rendering the first control signal operational. Such rather time-consuming procedure steps can be dealt with without difficulty.

A separate delay member is peferably provided for the second time delay. Repeated blocking and unblocking ("squegging") can thus be easily avoided.

The second memory preferably comprises at least two sub-memories, the measuring device being suitable for the detection of a third degree of filling at which a first sub-memory is completely filled, in order to control the transfer of the contents of the first submemory to a second sub-memory, the first degree of filling being determined as a fractional filling of the first sub-memory and the said second degree of filling being detected as the empty condition of the second sub-memory after the digital information elements stored therein have been output via the second information output. A simple co-operation between the two sub-memories within the second memory is thus realized.

The first and second degree of filling preferably have directly successive digital values. This results in simplified signalling.

BRIEF DESCRIPTION OF THE DRAWINGS

The invention will be described in detail hereinafter with reference to a number of Figures.

DESCRIPTION OF THE PREFERRED EMBODIMENTS

Figure 1:
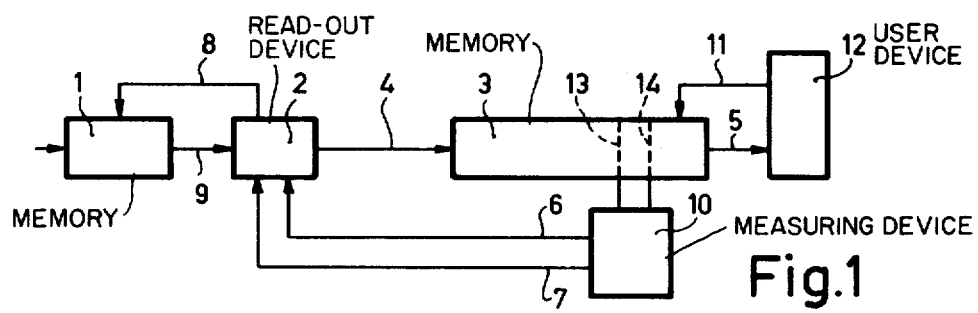
FIG. 1 diagrammatically shows a first embodiment in accordance with the invention.

FIG. 1 diagrammatically shows a first embodiment in accordance with the invention. The device comprises a first memory 1, a read-out device 2, a second memory 3, a first output line 4, a second output line 5, two control lines 6 7, a read line 9 and a read control line 8. The first memory may be, for example, a random access memory or a tape memory. It may form part of a device for processing digital data which is not shown. The read-out device 2 device 2 applies, via the line 8, read control signals to the first memory 1, for example, address signals and selection signals whereby memories which are known per se are read out. These signals may alternatively be drive signals for a motor which drives the tape. The information signals are applied to the read-out device 2 via the line g. These signals may again be of a different nature. In the case of a matrix memory, these signals are the information bits. In the case of a magnetic tape or disc, they are the magnetization fields of the tape passed along the read head. In the case of a punched tape, these signals are optical signals. The read-out device 2 converts the signals of the line 9, if necessary, and amplifies these signals; this device could comprise a parallel/series converter. The information signals can subsequently be applied, via the line 4, to the second memory 3. This may be a shift register, but in given cases it is advantageous to use a random access memory. Write members and any addressing members for this store, however, are not shown for the sake of simplicity. The measuring device 10 can determined the degrees of filling of the second memory 3. In the case of a random access memory, this procedure can be effected as described in the article by Skov and Newman. In the case of a shift register, the filling degree can be determined by means of a counter which updates the incoming and outgoing flows of information elements. The information elements are output on the output side of the second memory 3, via the line 5, to the user device 12 which supplied appropriate request signals via the line 11.

The first memory may be a magnetic tape which is arranged at some distance. The user device 12 may be an information printer which prints the information in the form of legible character. A printer of this kind can comprise a printing member which prints a character in a given position in a line substantially instantaneously. Between successive characters, it can be shifted through one character position; this requires comparatively little time. Such a printer also obeys other commands: "carriage return"; "new line"; "tabulation". These intructions require more time than the printing of a single character. The shorter the mean length of successive lines to be printed, the less advantageous. Very short lines (less than ten characters), however, do not frequently occur. The most unfavourable case has been found in practice to be the printing of 15 characters on a line comprising, for example, 80 character positions. Previously, the input speed of information was limited by the lowest printing speed occurring in practice. It is advantageous to introduce the second memory 3 as a buffer memory. Commercially available, inexpensive memories have a capacity of $2^n$ positions and a capacity of 64 character positions appears to be a good choice in this case. The occurrence of an overflow condition would every undesirable in this second memory, because information would be lost. It has been found that this must be signalled some time in advance, for example, when the symbolically denoted filling degree 14 is reached. This corresponds, for example, to a filling degree of 56 out of 64 characters. The measuring device 10 detects this filling degree and applies a blocking signal, via the line 7, to the read-out device 2, with the result that the reading is blocked for the time being, no further information signals then reaching the second memory 3 via the line 4. However, this may take some time: the delay time incurred on the lines 7 and 4 has an effect, and also the response time of the blocking circuit in the read-out device 2 and any run-out of the mechanical tape drive of the first memory 1. Furthermore, the line 4 may be the transport line in a data communication metwork subject to the usual ECMA standardization or other rules. These rules stipulate inter alia that the interruption of the connection and the restoration must be accompanied by special signal patterns. Furthermore, it may be that characters must always be transferred as an information entity (record) comprising, for example, a predetermined number of characters because test characters are also transferred. The transfer cannot be stopped instantaneously. An effect of this kind is sometimes referred to as the "pipe-line effect"; some characters may still be present in the "pipe-line" in such a case. In the case under consideration, the device is proportioned so that at the most $64 - 56 = 8$ characters can still arrive in the second memory 3 after the measuring device 10 has detected the first filling degree. The supply of characters is then stopped for the time being. If the user device 12 starts to output information again, the filling degree becomes lower again. The highest filling degree reached may lie between 56 and 64 characters, depending on the speed of blocking in the device 2, and also in view of the pipe-line effect and the information output by the device 12 which may meanwhile occur. If the measuring device 10 subsequently detects the second filling degree, symoblically denoted in this case by the broken line 13, an unblocking signal is despatched, via the line 6, to the read-out device 2, so that reading is resumed. This second filling degree can amount to, for example, $56 - 1 = 55$ characters in this case. Thus, an hysteresis effect is introduced. The resumption of reading implies that character information starts to arrive in the second memory 3 again after a delay. This delay may also have different causes; for example, it may be based on the ECMA standardization involving several procedure steps which are required when transmission is resumed. The delays incurred upon switching off and switching on may differ. The hysteresis, in conjunction with the two delays, also prevents the repeated alternation of blocking and unblocking (so-termed "squegging").

When the buffer function is introduced, the information input speed can be higher than implied by the said most unfavorable case of 15 characters per line. The limit consists in that the input speed corresponds to the output speed for the case of repeated fully occupied lines. In practice a compromise will be chosen, in the foregoing case, for example, correspondng to 30 characters per line of text. A higher information transport speed is thus obtained. On the other hand, an advantageous asynchronous co-operation between the devices 1 and 12 is achieved.

Another possiblilty yet exists. The received information can then be used at option either for a fast display device or a printer. If only rarely a printed copy (hard copy) is required, an inexpensive, slow printer is desirable for printing a text in the comparatively few cases. However, in the case of the normally used display device types it is as yet not possible to indirectly print (off-line) the received information. The invention can then be used or maintaining a direct contact (on-line) with the read-out device of the first memory by way of a slow printer.

Figure 3:
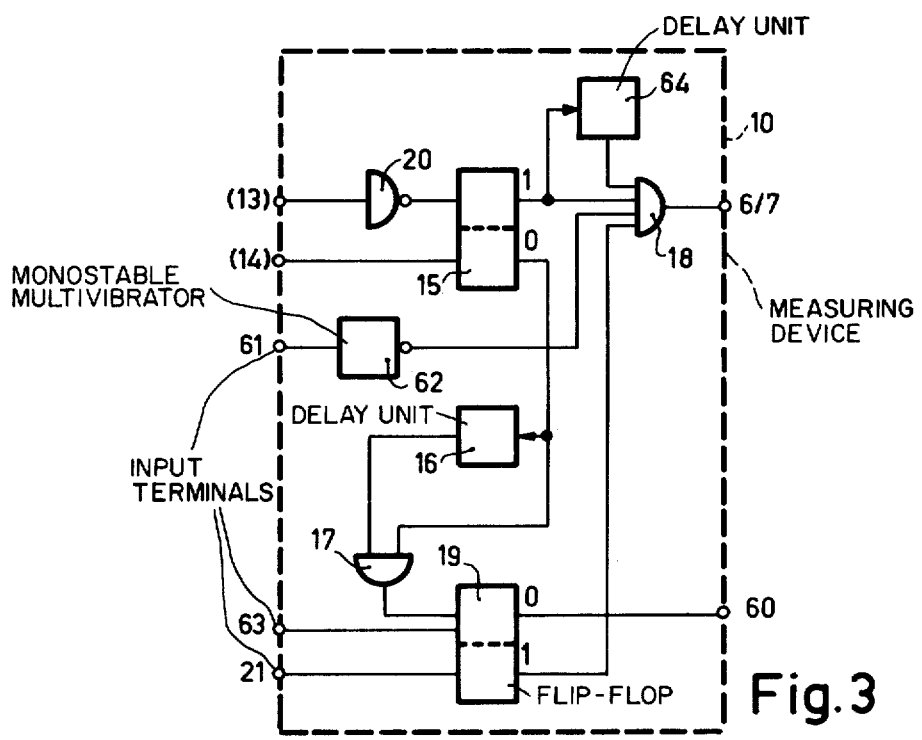
FIG. 3 shows an elaborated detail of the measuring device of FIG.

The lines 6 and 7 can be combined. In this respect, FIG. 3 shows a further elaboration of the measuring device 10. During normal operation, all inputs of the AND-gate 18 are logic 1 the 1-output signal of this gate having an unblocking effect on the read-out device 2 via the liines 6/7. When the first filling degree is detected, a logic 1 appears on the line 14, corresponding to the level 14 of FIG. 1, with the result that the flip-flop 15 is set to the zero position and the logic AND-gate 18 is blocked. The output signal of the O-output of the flip-flop 15 is furthermore applied to the delay unit 16 and the AND-gate 17. The unit 16 introduces a delay of, for example, 0.7 seconds. If the flip-flop 15 remans in the zero position for at least 0.7 seconds, the AND-gate 17 receives two logic 1 signals, with the result that the flip-flop 19 is set to the zero position. The flip-flop 19 then continues to block the AND-gate 18. An error condition is thus signalled; an error of this kind may consist in the lack of paper; the zero output of the flip-flop 19 can apply such an error condition to an indicator via the line 60.

However, if the lower filling degree 13 of FIG. 1 is reached within the said 0.7 seconds, the line 13 becomes logic 0", with the result that the flip-flop 15 is reset to the

1 position via the inverter 20. The gate 18 again receives two logic 1 signals; moreover, the gate 17 can never receive two 1 signals. Should the flip-flop 9 still reach the O-position, there will be a defect which must be repaired. Subsequently, the proceed situation can be restored by an additional signal on the terminal 21. The gate 18 can furthermore be blocked in a different manner. When a signal is applied to the input terminal 61, the output (indicated by a circle) of the monostable multivibrator 62 temporarily becomes 0", with the result that the AND-gate 18 supplies a low signal, for example, during a fraction of a second. It is further possible to set the flip-flop 19 to the zero position by applying a signal to the input terminal 63, with the result that the AND-gate 18 is blocked. The input terminals 21, 61, 63 may comprise corresponding keys which are to be operated by an operator. Three control modes for halting the information transport are thus implemented in a single, simple device, i.e.:

a. brief interruption under external control (BREAK), which may be interpreted as a signal that no further output of information is required or desired.

b. stopping under external control (HOLD), if no further information output is possible, for example, due to a defect or lack of paper.

c. automatic interruption (AUTOMATIC BREAK) or temporary stopping (TEMPORARY HOLD) under the control of the degree of filling of the second memory.

The determination of the degree of filling can be effected in various ways. For example, the second memory may be a "breathing" buffer, so that all information is present in a sequence of cells, the first one of cells always occupying the same position and all other "filled" cells being arranged consecutively to first cell: in that case it is only necessary to detect whether character information is present or not in a given cell. Breathing buffers of this kind are known per se. On the other hand, the article by Skov and Newman discloses a different method of determining different degrees of filling.

The device shown in the FIGS. 1, 3 can be modified in various manners. For example, FIG. 3 shows a further delay unit 64. This unit is not related to the delay unit 16. It can be used, for example, when the various filling degrees are so that only the reaching of a given filling degree $k$ is signalled. So, the bocking is initiated at a filling degree $\geq k$, but the unblocking at a filling degree $<k$. When the 1-output of the flip-flop 15 becomes high, the output of the delay unit 64 becomes high only a fraction of a second later. This additional delay in the reaching of the high state of the output of the AND-gate 18 can be a further step to reduce the risk of "squegging".

Figure 2:
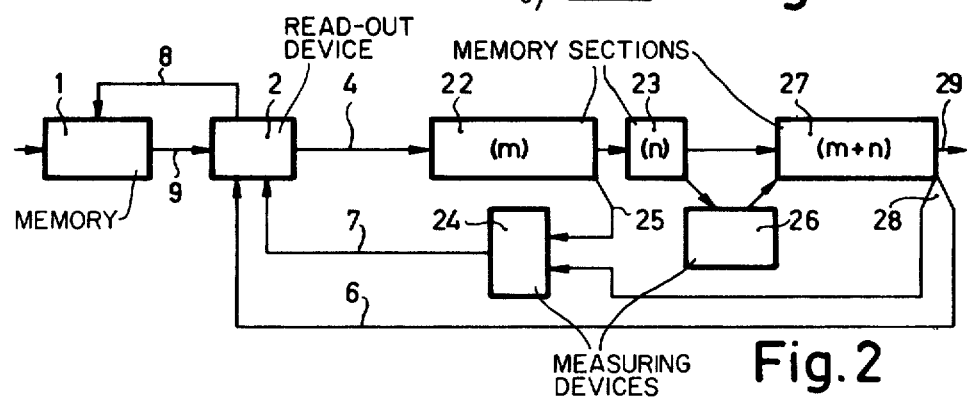
FIG. 2 diagrammatically shows a second embodiment in accordance with the invention.

FIG. 2 diagrammatically shows a second embodiment in accordance with the invention. A representation similar to that of FIG. 1 has been pursued: corresponding components are denoted by the same references. The user device (12) has been omitted or the sake of simplicity. The second memory now consists of three section, 22, 23, 27, which are constructed as shift registers having a width of one complete character, for example, seven bits. The shift register 22 can contain $m$ characters, whilst the shift register 23 can contain $n$ characters, and the shift register 27 $m + n$ characters. For example, $m = 30$ and $n = 2$. If the read-out device 2 is not blocked, character information can continuously appear on the line 4, the information being stored in the shift register 22 in which it is shifted further in synchronism with the arrival of new character information. As a result, the first $j$ positions ($j \leq m$) of the shift register 22 are always occupied. This process continues when the shift reigster 22 is completely full until $j = m + n$. This is detected by the device 26 constitutes the measuring device in conjunction with the device 24. This device 26 detects, as will appear later, a filling degree of $(m + n)/2(m + n) = \frac{1}{2}$, related to the entire second memory. In reaction thereto, the device 26 controls a quick transfer of the entire contents of the shift registers 22, 23, to the shift register 27, that is to say within the period of time expiring between the appearance of two directly consecutive character informations on the line 4. If desired, the character information can then be output via the line 29. The shift register 27 is adapted so that always the $k$ last positions thereof are occupied ($0 \leq k \leq m+n$). Consequently, the first $(m + n - k)$ positions thereof are void. The last position is almost always occupied: the user device can always have the information of this position available by shifting the information in the shift register 27 through a single position.

However, if the shift register 22 is completely full ($j = m$) and the shift register 27 is not yet completely empty ($k > 0$), detection takes place, via the lines 25 and 28, by the device 23 which then despatches the blocking signal via the line 7, with the result that the further transmission of character information is blocked after a delay. Consequently, the filling degree for the entire second memory then is at least: $(m + 1)/2(m + n)$ and at most: $f(2m + n)/2(m + n)$. When the shift register 27 is empty, an unblocking signal is directly applied to the read-out device 2 via the line 6. If no blocking had occurred at that instant the filling degree amounts to at least O and at the most $m/2(m + n)$, disregarding the overflow in the shift register 23. If the blocking had occurred, the filling degree is at least: $m/2(m + n)$ and at most: $\frac{1}{2}$. When a device as shown in FIG. 1 is used, for example, a user device 12 which is slow in unfavourable conditions can be connected to a data source which is actually too fast. The independent operation of the source is not influenced thereby; this is not always permitted in a data communication atmosphere either, for example, in view of the ECMA standization. When a device as shown in FIG. 2 is used, for example, a comparatively fast user device can be advantageously connected to a comparatively slow data source $\frac{1}{2}$. However, the latter does not represent a restriction. For example, the source may be a punched tape reader having a speed of 50 character per second, whilst the user device 12 may be a mozaic printer also having a speed of 50 character per second. In all cases an hysteresis situation is created for the adaptation of temporary differences in speed. The flow direction of the control signals opposes the flow direction of the information signals.

Figure 4:
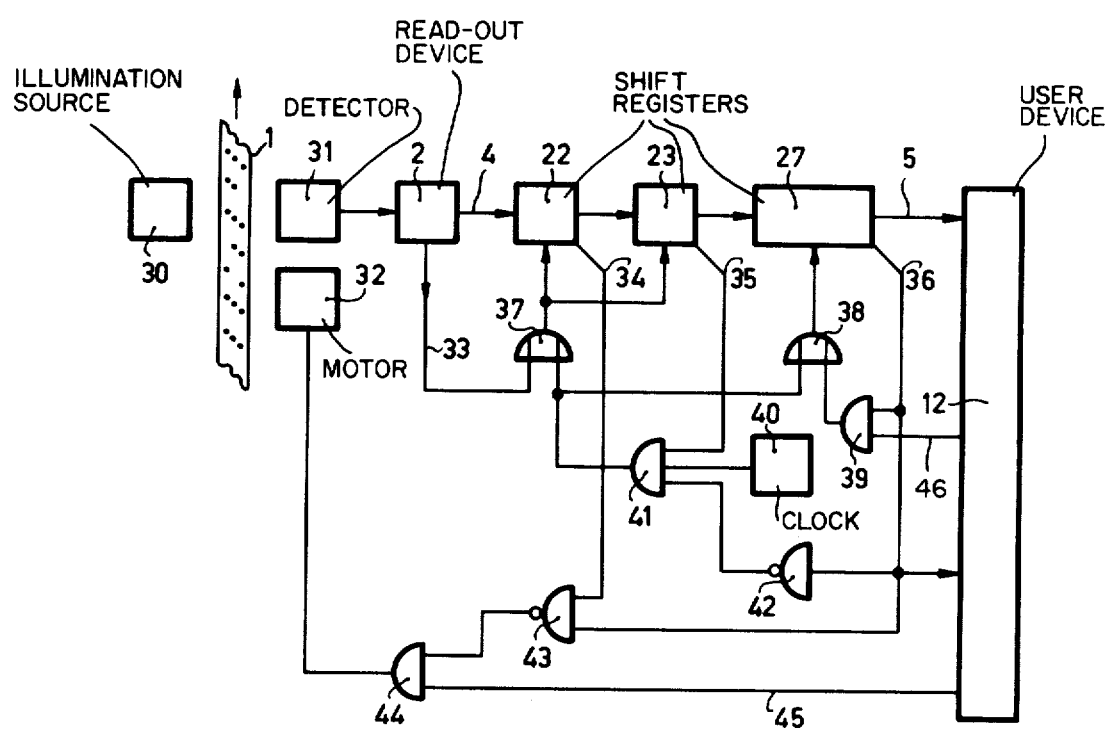
FIG. 4 shows an implementation of the embodiment of FIG. 2.

FIG. 4 shows a further elaborate embodiment of the device shown in FIG. 2. The user device 12 grants the tape reader (30, 31, 32 2) approval to start by way of a logic 1 signal on the line 45. Via the AND-gate 44 (which also receives a logical 1-signal from the gate 43), the motor 32 is switched on, with the result that the tape 1 is transported. The light of the illumination source 30 is projected through the apertures in the tape 1 and is focussed on the detector 31. The light is thus modulated, and therefrom the read-out device 2 composes digital characters which appear on an output line 4.

Simultaneously, on an additional output 33 of the read-out device 2 a clock signal is generated which is synchronous with these characters, for example, in that it is derived from a punched track in the tape specially provided for this purpose. Via the OR-gate 37, this clock signal is applied to the shift registers 22 and 23, with the result that the characters received via the line 4 are stored in synchronism with the advancing of previously received and shifted information. The line 4 can consist, for example, of seven parallel wires which each transport one bit of the characters, plus an additional wire on which it is signalled whether or not the associated information represents a character. The signalling bits are shifted, simultaneously with the character bits, into the shift registers and are each time available, as regards the last character position of the shift registers 22, 23, 27, on the outputs 34, 35, 36, respectively. The appearance of a logic 1 signal on the line 35 means that the shift registers 22 and 23 are completely full. If the signalling line 36 carries a logic 0 at that instant, the logic AND-gate 41 receives two unblocking control signals via the inverter 42. This gate then conducts the fast clock pulses of clock pulse generator 40 which are then applied, via the OR-gate 37, 38, to all three shift reigsters 22, 23, 27. The shift register 27 can contain as many characters as the shift registers 22 and 23 combined. When all information has been transferred from the shift registers 22, 23, at the same instant the signal on the line 35 becomes logic 0 (was 1) and the signal on the line 36 becomes logic 1 (was 0). As result, the logic AND-gate 41 receives (inter alia via the inverter 42) two blocking 0-signals, with the result that the supply of fast clock pulses from the generator 40 is blocked. The signal on the line 36 is applied to the user device 12 where it signals the availability of further information. The AND-gate 39 is then unblocked for clock pulses from the user device 12 on the line 46 which are also applied, via the OR-gate 38, to the shift register 27 in order to make the information contained therein successively available to the device 12.

The read-out device can meanwhile supply new character information, as has already been described, to the shift register 22. When the shift register 22 is full and the shift register 27 is not yet empty, the lines 34 and 36 both carry a logic 1. As a result, the output of the logic NAND-gate 43 becomes 0, with the result that the gate 44 supplies a logic 0 and, contrary to the already described situations, the motor 32 is switched off. This can also be effected by a logic 0-signal on the line 45. Due to the mechanical inertia of motor and drive, a further number of characters can be read, so that the shift register 23 acts as an overflow buffer. When all characters have been read from the shift register 27 and transported to the device 12, the signal on the line 36 becomes logic 0, with the result that the AND-gate 39 is blocked for further clock pulses on line 46 and the availability signal is not longer applied to the device 12. Moreover, the output of the NAND-gate 43 becomes logic 1 again, so that the motor 32 is switched on again. In many cases this will take place after some delay due to the mechanical properties of the motor.

What is claimed is:

1. A data transfer system comprising:

data input means for supplying digital data, said data input means including a first memory and having a data output;

read-out means, connected to said data output of said data input means, for sequentially reading out data from said first memory under control of a first read command signal, said read-out means haivng an output;

intermediate storage means connected to said output of said read-out means, for temporarily storing the read-out data;

measuring means, connected to said intermediate storage means, for determining the extend of filling of said intermediate storage means with said data, and including means for producing first and second alarm signals upon detection of certain predetermined conditions in said intermediate storage means, said first alarm signal being produced upon detection of said intermediate storage means reaching a predetermined first degree of filling, and said second alarm signal being produced upon detection of said second memory reaching a predetermined second degree of filling; and said measuring means further including blocking means, including a delay unit, responsive to said first alarm signal for blocking said first read command signal after a predetermined first delay produced by said delay unit.

2. A data transfer system as claimed in claim 1, wherein said intermediate storage means comprises a shift register for the temporary storage of said data.

3. A data transfer sytem as claimed in claim 1, wherein said first delay corresponds to the slowdown time of a mechanial drive operative for transporting a carrier with said first memory along said read-out means.

4. A data transfer system as claimed in claim 1, wherein said read-out means comprises means for detecting a coherent multibit information entity; said detecting means, in conjunction with the said first alarm signal, directly rendering said first read command signal operational.

5. A data transfer system as claimed in claim 1, further comprising a second delay unit, responsive to said second alarm signal, for unblocking said first read command signal after a predetermined second delay.

6. A data transfer system as claimed in claim 1, wherein said intermediate storage means comprises at least first and second sub-memories, said measuring means detecting a third degree of filling at which said first sub-memory is completely filled, for controlling the transfer of the contents of said first sub-memory to said second bus-memory; said first degree of filling being defined as a fractional filling of said first sub-memory, and said second filling degree being defined as the empty condition of said second sub-memory after the data stored therein has been outputted therefrom.

7. A data transfer system as claimed in claim 5, wherein the magnitude of said first and said second degrees of filling have successive digital values.

8. A data transfer system as claimed in claim 5, wherein the magnitude of said first and said second degrees of filling have the same digital value.

* * * * *

UNITED STATES PATENT AND TRADEMARK OFFICE
CERTIFICATE OF CORRECTION

PATENT NO. : 4,040,027

DATED : August 2, 1977

INVENTOR(S) : LAMBERTUS GERARDUS VAN ES ET AL

It is certified that error appears in the above-identified patent and that said Letters Patent are hereby corrected as shown below:

Column 1, line 29, "2.6" should be --2/6--

Column 2, line 14, "submemory" should be --sub-memory--
        line 35, "FIG." should be --FIG. 1.--
        line 45, "6 7," should be --6, 7,--
        line 55, "g" should be --9--

Column 3, line 1, "determined" should be --determine--
        line 10, "supplied" should be --supplies--
        line 36, "every" should be --be very--
        line 52, "metwork" should be --network--

Column 4, line 24, delete "said"
        line 48, "1 the 1-output" should be --"1" the "1"-output--
        line 51, "1" should be --"1"--
        line 59, "1" should be --"1"--
        line 68, "0" should be --"0"--

Column 5, line 1, "1" should be --"1"--
        line 2, "1" should be --"1"--
        line 3, "1" should be --"1"--
        line 10, "0" should be --"0"--
        lines 10-19, should not be bold type face

UNITED STATES PATENT AND TRADEMARK OFFICE
CERTIFICATE OF CORRECTION

PATENT NO. : 4,040,027
DATED : August 2, 1977
INVENTOR(S) : LAMBERTUS GERARDUS VAN ES ET AL It is certified that error appears in the above-identified patent and that said Letters Patent are hereby corrected as shown below:

Column 5, line 30, "degree" should be --degrees--
          line 61, "section" should be --sections--

Column 6, line 6, "constitutes" should be --which constitutes--
          line 32, "f(2m" should be --(2m--
          line 51, "character" should be --characters--
          line 53, "character" should be --characters--
          line 58, "elaborate" should be --elaborated--
          line 60, "(30, 31, 32 2" should be --(30, 31, 32, 2)--
          line 61, "1" should be --"1"--
          line 62, "1-signal" should be --"1"-signal--

Column 7, line 18, "1" should be --"1"--
          line 20, "0" should be --"0"--
          line 29, "0 (was 1)" should be --"0" (was "1")--
          line 30, "1 (was 0)" should be --"1" (was "0")--
          line 31, "0-" should be --"0"- --
          line 45, "1" should be --"1"--
          line 46, "0" should be --"0"--
          line 47, "0" should be --"0"--
          line 49, "0-signal" should be --"0"-signal--
          line 55, "0" should be --"0"--
          line 57, "not" should be --no--

UNITED STATES PATENT AND TRADEMARK OFFICE
CERTIFICATE OF CORRECTION

PATENT NO. : 4,040,027

DATED : August 2, 1977

INVENTOR(S) : LAMBERTUS GERARDUS VAN ES ET AL

It is certified that error appears in the above-identified patent and that said Letters Patent are hereby corrected as shown below:

Column 7, line 59, "1" should be --"1"--

Claim 1, line 8, "haivng" should be --having--

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*